US012811773B2

(12) United States Patent
Ju et al.

(10) Patent No.: US 12,811,773 B2
(45) Date of Patent: Nov. 24, 2026

(54) SERVER DEVICE FOR HANDLING HOMOMORPHIC ENCRYPTED DATA, AND METHODS THEREOF

(71) Applicants: CRYPTO LAB INC., Seoul (KR); SEOUL NATIONAL UNIVERSITY R&DB FOUNDATION, Seoul (KR)

(72) Inventors: Jae Hyung Ju, Seoul (KR); Jaiyoung Park, Seoul (KR); Jung Hee Cheon, Seoul (KR); Jung Ho Ahn, Seoul (KR)

(73) Assignees: CRYPTO LAB INC., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 78 days.

(21) Appl. No.: 18/971,904

(22) Filed: Dec. 6, 2024

(65) Prior Publication Data

US 2026/0012326 A1 Jan. 8, 2026

(30) Foreign Application Priority Data

Jul. 5, 2024 (KR) ........................ 10-2024-0089207

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
None
See application file for complete search history.

(56) References Cited

U.S. PATENT DOCUMENTS

| | | | | |
|---|---|---|---|---|
| 11,823,060 | B2 | 11/2023 | Antic | |
| 12,093,798 | B2 * | 9/2024 | Gidney | H04L 63/0428 |
| 2020/0228307 | A1 | 7/2020 | Cheon et al. | |
| 2021/0119766 | A1 | 4/2021 | Suresh et al. | |
| 2024/0097878 | A1 | 3/2024 | Lee et al. | |

(Continued)

OTHER PUBLICATIONS

Hyung Ju, Jae et al. "NeuJeans: Private Neural Network Inference with Joint Optimization of Convolution and Bootstrapping", Dec 7, 2023, Version 1 (Year: 2023).*

(Continued)

*Primary Examiner* — Brandon Hoffman
(74) *Attorney, Agent, or Firm* — Steinfl + Bruno LLP

(57) ABSTRACT

Disclosed is a server device. The server device includes a communication unit configured to perform communication with an electronic device; a memory configured to store an artificial intelligence (AI) model for performing computation in an encrypted state; and a processor, in which the processor is configured to based on receiving homomorphic ciphertext of CinS-encoded data obtained by performing CinS encoding on a plurality of images from the electronic device through the communication unit, transmit the encryption computation result to the electronic device through the communication unit by obtaining an encryption computation result by inputting the homomorphic ciphertext to the AI model, wherein. the AI model performs each of convolutional computation based on the CinS-encoded data and activation function computation based on slot-encoded data converted from the CinS-encoded data a plurality of times.

10 Claims, 21 Drawing Sheets

(56) References Cited

U.S. PATENT DOCUMENTS

| | | | | |
|---|---|---|---|---|
| 2024/0163075 | A1* | 5/2024 | Ku | G06N 3/08 |
| 2024/0171372 | A1 | 5/2024 | Kim et al. | |
| 2025/0158799 | A1 | 5/2025 | Ji | |
| 2026/0012327 | A1 | 1/2026 | Ju et al. | |

OTHER PUBLICATIONS

Hyung Ju, Jae et al. "NeuJeans: Private Neural Network Inference with Joint Optimization of Convolution and Bootstrapping" Publication Date: Dec 7, 2023. Version 1. 16 pages.

Hyung Ju, Jae et al. "NeuJeans: Private Neural Network Inference with Joint Optimization of Convolution and Bootstrapping" Publication Date: Dec 7, 2023. Version 2. 15 pages.

Huang, Y. F., "Design and Implementation of Big Data Analysis Algorithm in Ciphertext Domain Based on Homomorphic Encryption", Jul. 25, 2021, pp. 144-150.

Kannivelu, S. D., "A Homomorphic Encryption Based Adaptive Image Filter Using Division Over Encrypted Data", Apr. 20, 2021, IEEE, pp. 67-72.

Notice of Allowance issued for U.S. Appl. No. 18/972,318, filed Dec. 6, 2024 on behalf of Crypto Lab Inc. etl al.. Mail Date: Apr. 15, 2026. 11 Pages.

* cited by examiner

FIG. 6

| Encoding Method | # of Homomorphic Rotations | Level Consumption |
|---|---|---|
| Slot Encoding | $2f^2 + 2C - 4$ | 1 |
| Coefficient Encoding | $C - 1$ | 1 |
| Ours (CinS Encoding) | $2\sqrt{C} - 2$ | 0 |

(a) Our method (b) Coefficient encoding

SERVER DEVICE FOR HANDLING HOMOMORPHIC ENCRYPTED DATA, AND METHODS THEREOF

The present application claims priority to Korean Patent Application No. 10-2024-0089207 filed on Jul. 5, 2024 and incorporated herein by reference in its entirety. The present application is also related to Korean Patent Application No. 10-2024-0180732 filed on the same day of the present application, Dec. 6, 2024, and incorporated herein by reference in its entirety.

BACKGROUND

Field

Apparatuses and methods consistent with the disclosure relate to a server device performing encryption computation on a homomorphic ciphertext and a data processing method thereof.

Description of the Related Art

In accordance with the development of an electronic technology, various types of electronic devices have been developed. Such electronic devices may provide various services for a user while performing communication with various external devices including a server device.

One of the services may be a medical service. A user may transmit an image such as an X-ray image, a computed tomography (CT) scan image, or an image of a lesion taken directly using a mobile phone of the user to an external device, and a user (for example, a doctor) of the external device may transmit a diagnosis result thereof. Recently, with the development of an artificial intelligence (AI) technology, it is possible to receive a diagnosis result of an AI model by transmitting various images to a server device where the AI model is stored without a professional, such as a doctor, directly performing diagnosis.

In order to use such a service, the user needs to provide various images related to himself or herself to an external server device. In this case, there is a possibility that the images may be leaked and exploited during a process of transmitting the images to the server device or by an administrator of the server device.

One of the solutions to solve such a problem may be a homomorphic encryption technology. According to the homomorphic encryption technology, computation may be performed in a state in which data is encrypted, and thus, there is no risk that an external third party may grasp a content of the data.

However, for the image-type data described above, a considerable overhead may occur when performing computation in a homomorphically encrypted state on the server device.

Accordingly, a need for an appropriate encryption processing technology for images has arisen.

SUMMARY

The disclosure has been made in an effort to solve the above-described problems, and the disclosure provides a server device and data processing methods for efficiently performing computation on a homomorphic ciphertext of an image in an encrypted state.

A server device according to at least one embodiment of the disclosure includes: a communication unit configured to perform communication with an electronic device; a memory configured to store an artificial intelligence (AI) model for performing computation in an encrypted state; and a processor, in which the processor is configured to based on receiving homomorphic ciphertext of CinS-encoded data obtained by performing CinS encoding on a plurality of images from the electronic device through the communication unit, transmit the encryption computation result to the electronic device through the communication unit by obtaining an encryption computation result by inputting the homomorphic ciphertext to the AI model, wherein the AI model performs each of convolutional computation based on the CinS-encoded data and activation function computation based on slot-encoded data converted from the CinS-encoded data a plurality of times.

The AI model may perform the convolutional computation based on the CinS-encoded data and the model parameter and perform image-wise inverse discrete Fourier transform (IDFT) on result data to convert the CinS-encoded data into the slot-encoded data, and perform image-wise DFT on the converted slot-encoded data to convert the slot-encoded data into CinS-encoded data for subsequent convolutional computation.

The AI model may perform bootstrapping that expands a plaintext space of the homomorphic ciphertext together while performing the convolutional computation and the activation function computation.

The bootstrapping may include an StoC operation including a first StoC operation of performing the image-wise DFT on the homomorphic ciphertext and a second StoC operation of mixing all of DFT results, a modular raise (ModRaise) operation of increasing a modulus of the homomorphic ciphertext, a CtoS operation of converting a coefficient-encoded data into the slot-encoded data, and a modular reduction evaluation (ModEval) operation, and the first StoC operation may correspond to the image-wise DFT performed to convert the slot-encoded data into the CinS-encoded data in the AI model.

The second StoC operation and the CtoS operation may correspond to the image-wise IDFT performed to convert the CinS-encoded data into the slot-encoded data in the AI model, and the AI model may perform the modular raise operation between the second StoC operation and the CtoS operation, and perform the modular reduction evaluation operation after the image-wise IDFT.

Meanwhile, a data processing method of a server device according to at least one embodiment of the disclosure includes: receiving a homomorphic ciphertext of CinS-encoded data obtained by performing CinS encoding on a plurality of images from an electronic device; obtaining an encryption computation result by inputting the homomorphic ciphertext to an AI model for performing computation in an encrypted state; and transmitting the encryption computation result to the electronic device, in which in the obtaining of the encryption computation result, each of an operation of performing convolutional computation based on the CinS-encoded data, an operation of converting the CinS-encoded data into slot-encoded data, and an operation of performing activation function computation based on the converted slot-encoded data is performed a plurality of times.

The obtaining of the encryption computation result may include: performing the convolutional computation based on the CinS-encoded data and the model parameter and performing image-wise IDFT on result data to convert the CinS-encoded data into the slot-encoded data; and performing image-wise DFT on the converted slot-encoded data to convert the slot-encoded data into CinS-encoded data for subsequent convolutional computation.

Alternatively, the AI model may perform bootstrapping that expands a plaintext space of the homomorphic ciphertext together while performing the convolutional computation and the activation function computation.

The bootstrapping may include an StoC operation including a first StoC operation of performing the image-wise DFT on the homomorphic ciphertext and a second StoC operation of mixing all of DFT results, a modular raise (ModRaise) operation of increasing a modulus of the homomorphic ciphertext, a CtoS operation of converting a coefficient-encoded data into the slot-encoded data, and a modular reduction evaluation (ModEval) operation of reducing the modulus of the homomorphic ciphertext, and the first StoC operation may correspond to the image-wise DFT performed to convert the slot-encoded data into the CinS-encoded data in the AI model.

The second StoC operation and the CtoS operation may correspond to the image-wise IDFT performed to convert the CinS-encoded data into the slot-encoded data in the AI model, and in the encryption computation, the AI model may perform the modular raise operation between the second StoC operation and the CtoS operation, and perform the modular reduction evaluation operation after the image-wise IDFT.

According to the various embodiments of the disclosure described above, computation may be efficiently performed on an image using an AI model that performs the computation in an encrypted state, thereby reducing excessive operation burden and guaranteeing personal privacy.

BRIEF DESCRIPTION OF THE DRAWINGS

FIG. 6 is a table illustrating an effect when CinS encoding is performed according to an embodiment of the disclosure.

DETAILED DESCRIPTION

In an information (data) transmission process performed in the disclosure, encryption/decryption may be applied as needed. In the disclosure and claims, expressions describing the information (data) transmission process are to be construed as including the case of performing encryption/decryption, even if not mentioned separately. Expressions such as "transmit (transfer) from A to B" or "receive by A from B" in the disclosure include transmission (transfer) or reception of another medium in between, and do not just represent direct transmission (transfer) from A to B or direct reception by A from B.

In the description of the disclosure, the order of each step should be understood to be non-limiting, unless the preceding step must be performed logically and temporally before the following step. In other words, except for the exceptional case above, even if the process described in the following step is performed before the process described in the preceding stage, the nature of the disclosure is not affected and the scope of the right should be defined regardless of the order of the steps. Further, in the specification, "A or B" is defined to mean not only selectively indicating either one of A and B, but also including both A and B. In the disclosure, the term "including" has a meaning encompassing further including other components in addition to the included elements listed.

In the disclosure, only essential components necessary for the description of the disclosure are described, and components unrelated to the essence of the disclosure are not mentioned. Further, it should not be interpreted as an exclusive meaning that includes only the mentioned components, but should be interpreted as a non-exclusive meaning that may include other components.

In the disclosure, the term "value" is defined as including not only a scalar value but also a vector.

A mathematical computation and calculation of each step of the disclosure to be described later may be implemented by a computer operation by a well-known coding method for carrying out the computation or the calculation, and/or coding designed suitable for the disclosure.

Specific mathematical formulas described below are exemplarily described among various possible alternatives, and the scope of the disclosure should not be construed as being limited to the mathematical formulas mentioned in the disclosure.

For convenience of explanation, the following notations will be used in the disclosure.

$a \leftarrow D$: Select element (a) according to distribution (D)

$s1, s2 \in R$: Each of $S_1$ and $S_2$ is an element of a set R.

mod(q): Perform modular computation by an element q $\lceil \cdot \rfloor$: Round up an internal value Hereinafter, various embodiments of the disclosure will be described in detail with reference to the accompanying drawings.

Figure 1:
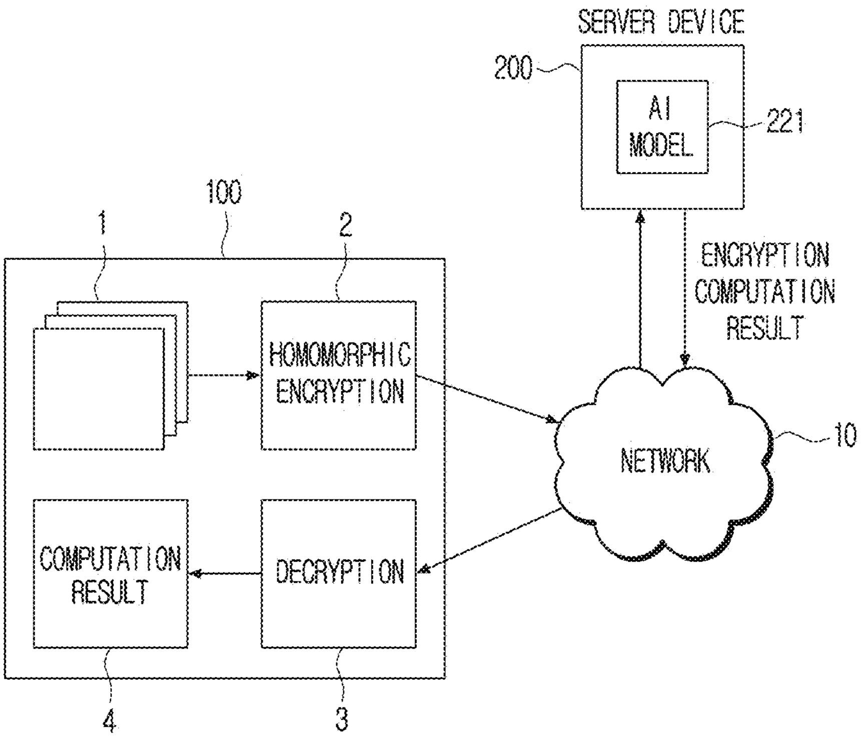
FIG. 1 is a diagram for describing operations of an electronic device and a server device according to at least one embodiment of the disclosure.

FIG. 1 is a diagram for describing operations of an electronic device and a server device according to at least one embodiment of the disclosure.

Referring to FIG. 1, an electronic device 100 and a server device 200 may perform communication with each other through a network 10. The network 10 may be implemented by various types of wired and wireless communication networks, a broadcasting communication network, an optical communication network, a cloud network, or the like, and the respective devices may be connected to each other by a method such as wireless fidelity (Wi-Fi), Bluetooth, and near field communication (NFC), without a separate medium.

Although FIG. 1 illustrates one electronic device 100, the electronic device 100 may be implemented in a plurality of different types. For example, the electronic device 100 may be various types of devices such as a smartphone, a tablet, a personal computer (PC), a laptop PC, a home server, a kiosk, a game player, and a camera. In addition, the electronic device 100 may be implemented in the form of a home appliance to which an Internet of Things (IoT) function is applied. In a case where the electronic device 100 includes a camera, the electronic device 100 may directly capture and acquire at least one image 1. In a case where the electronic device 100 does not include a camera, the electronic device 100 may receive and store the image 1 from an external device (for example, a camera or a memory stick) through various wired or wireless interfaces. In various embodiments of the disclosure, the image 1 may be a photographic image, but is not necessarily limited thereto, and may be a graphic image. Alternatively, the image 1 may be a video content including a plurality of image frames.

The electronic device 100 may perform homomorphic encryption 2 on at least one image to acquire a homomorphic ciphertext, and then transmit the homomorphic ciphertext to the server device 200 through the network 10.

For example, in a case where a captured image, an X-ray image, a computed tomography (CT) image, or the like of a body of a user is stored in the electronic device 100, the user may want to obtain a diagnosis result based on the image by transmitting the image to the external server device 200.

In this case, there is a possibility that the image 1 may be hacked and leaked to the outside during a transmission process or may be leaked by an administrator of the server device 200. However, in a case where the image is transmitted in the form of a homomorphic ciphertext, the image may not be identified even in a case where the image is leaked to the outside. Therefore, security of personal information or physical characteristics of the user may be enhanced.

There may be various homomorphic encryption algorithms for generating the homomorphic ciphertext, but various embodiments of the disclosure will be described based on a case where the homomorphic encryption is performed using a CKKS scheme or a modified algorithm based on the CKKS scheme.

The electronic device 100 may perform encoding to transmit the image in the form of a homomorphic ciphertext. In the homomorphic encryption, the encoding may be a task of converting data into an encryptable format. The homomorphic encryption is based on a mathematical structure (for example, polynomial computation). Therefore, for the image 1, the homomorphic encryption may be performed after converting the image 1 into a form that may be processed by the homomorphic encryption algorithm.

In the homomorphic encryption, slot encoding and coefficient encoding may be generally used.

The slot encoding is a method of allocating data to be encrypted to a plurality of slots and then encoding the data in units of entire slots. A slot refers to a data unit that may be stored in parallel in one homomorphic ciphertext. In a case where the ciphertext is expressed in a polynomial form, coefficients or roots of the polynomial may act as each slot. In a case where one ciphertext includes a total of n slots, n values may be encoded or computed at the same time. In other words, when the slot encoding is performed, parallel computation may be performed on the homomorphic ciphertext. The slot encoding method may vary depending on the homomorphic encryption algorithm. The above-described CKKS scheme may perform the slot encoding using a fast Fourier transform (FFT).

The coefficient encoding is a method of converting data to be encrypted into a polynomial form and converting coefficients of the polynomial into encrypted values. The above-described CKKS scheme may perform the coefficient encoding by converting real number data into an integer and adding the integer to the coefficient of the polynomial or by using a discrete Fourier Transform (DFT) in a state in which the slot encoding is performed.

According to an embodiment of the disclosure, the electronic device 100 may perform CinS encoding. The CinS encoding refers to a method of performing encoding by performing the DFT on a plurality of slot sections instead of the entire slot after performing the slot encoding. This will be described in detail in the following description.

Data encoded using the CinS encoding method is referred to as CinS-encoded data in the disclosure. The electronic device 100 transmits, to the server device 200, the homomorphic ciphertext obtained by performing the homomorphic encryption 2 on the CinS-encoded data.

The server device 200 is a device for performing computation on the homomorphic ciphertext (that is, at least one homomorphically encrypted image) provided from an electronic device 100 in a homomorphically encrypted state and providing an encryption computation result. The server device 200 may be implemented in various forms such as a web server and a cloud server.

The server device 200 may store an AI model 221 for performing computation in an encrypted state. In a case of receiving an image and performing computation based on the image as described above, the AI model 221 may be a convolutional neural network (CNN), but is not necessarily limited thereto.

Specifically, the AI model 221 may perform various types of computation on the homomorphic ciphertext encrypted with a homomorphic encryption technology (for example, the CKKS scheme) and output a computation result in the form of a homomorphic ciphertext. Hereinafter, the computation result output in the form of a homomorphic ciphertext is referred to as the encryption computation result.

In a case where the AI model 221 is implemented by the CNN, the AI model 221 of the server device 200 performs depth-wise convolutional computation or convolutional computation on the homomorphic ciphertext transmitted from the electronic device 100 by using a model parameter. Such a computation method will be described in detail in the following description.

The server device 200 transmits the encryption computation result to the electronic device 100 through the network 10. The electronic device 100 may perform decryption 3 on the received encryption computation result and provide a computation result 4 to the user. A method of providing the result may vary depending on the type and configuration of the electronic device 100. For example, in a case where the electronic device 100 includes a built-in display or is connected to an external display (for example, a monitor), the decrypted computation result 4 may be displayed. As another example, in a case where the electronic device 100 includes a speaker, a voice message corresponding to the computation result may be output through the speaker. As still another example, in a case where the electronic device 100 performs communication with another terminal device (for example, a smartphone), the decrypted computation result may be transmitted to the terminal device. In a case where the AI model 221 is a model trained to diagnose a disease, the computation result may include information regarding the presence or absence of the disease, a type of the disease, a progress of the disease, or the like diagnosed based on the image 1 of the user.

Figure 2:
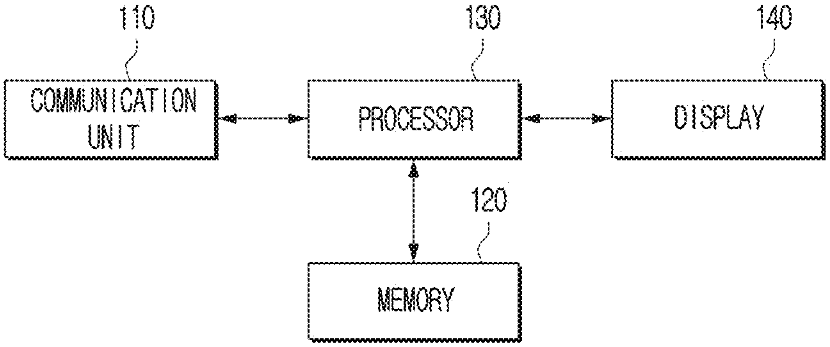
FIG. 2 is a block diagram illustrating a configuration of the electronic device according to at least one embodiment of the disclosure.

FIG. 2 is a block diagram illustrating the configuration of the electronic device according to at least one embodiment of the disclosure. Referring to FIG. 2, the electronic device 100 includes a communication unit 110, a memory 120, a processor 130, and a display 140.

The communication unit 110 is a component for performing communication with various external devices including the server device 200. The communication unit 110 may transmit and receive various signals and data to and from an external device through various wired and wireless communication manners such as wired/wireless local area network (LAN), wide area network (WAN), Ethernet, IEEE 1394, Bluetooth, access point (AP)-based Wi-Fi (wireless LAN network), Zigbee, high-definition multimedia interface (HDMI), universal serial bus (USB), mobile high-definition link (MHL), audio engineering society/European broadcasting union (AES/EBU), an optical manner, and a coaxial manner. For example, the communication unit 110 may also receive an image captured by an external camera.

The memory 120 is a component for storing various programs, data, instructions, and the like required for an operation of the electronic device 100. The memory 120 may be implemented as at least one of various memories such as a dynamic RAM (DRAM), a static RAM (SRAM), a synchronous dynamic RAM (SDRAM), a one time programmable ROM (OTPROM), a programmable ROM (PROM), an erasable and programmable ROM (EPROM), an electrically erasable and programmable ROM (EEPROM), a mask ROM, a flash ROM, a flash memory, a hard disk drive, and a solid state drive (SSD).

The memory 120 may store an image received through the communication unit 110 or an image taken or drawn by the electronic device 100.

The display 140 is a component for displaying various screens under the control of the processor 130. In FIG. 2, the display 140 is illustrated as a component included in the electronic device 100, but the display 140 is not limited thereto. The electronic device 100 may also be used while being connected to a display device (for example, a monitor, a TV, or a beam projector) provided separately from the electronic device 100.

The processor 130 is a component for controlling an overall operation of the electronic device 100. The processor 130 may perform various operations based on a command, a program, data, or the like stored in the memory 120.

The processor 130 may be implemented by a digital signal processor (DSP) or a microprocessor processing a digital signal. However, the processor 140 is not limited thereto, and may include one or more of a central processing unit (CPU), a micro controller unit (MCU), a micro processing unit (MPU), a controller, an application processor (AP), a communication processor (CP), an ARM processor, a graphics processing unit (GPU), a neural processing unit (NPU), and an artificial intelligence (AI) processor or may be defined by these terms. In addition, the processor 130 may be implemented by a system-on-chip (SoC) or a large scale integration (LSI) in which a processing algorithm is embedded or may be implemented in the form of a field programmable gate array (FPGA).

The CPU is a general-purpose processor that may perform not only general computation but also artificial intelligence computation, and may efficiently execute a complex program through a multi-layer cache structure. The CPU is advantageous in a serial processing method that enables organic linkage between the previous calculation result and the next calculation result through sequential calculations.

The GPU is a processor for large-scale computation such as floating point computation used in graphic processing, and may perform large-scale computations in parallel by integrating a large number of cores. In particular, the GPU may be more advantageous in a parallel processing method such as the convolutional computation than the CPU. Further, the GPU may be used as a co-processor to supplement a function of the CPU.

The NPU is a processor specialized in artificial intelligence computation using an artificial neural network, and each layer included in the artificial neural network may be implemented by hardware (for example, silicon). At this time, the NPU is designed to be specialized according to required specifications of a company, and thus has a lower degree of freedom compared to the CPU or the GPU, but the NPU may efficiently perform the artificial intelligence computation requested by the company. Meanwhile, as the processor specialized in the artificial intelligence computation, the NPU may be implemented in various forms such as a tensor processing unit (TPU), an intelligence processing unit (IPU), and a vision processing unit (VPU). An artificial intelligence processor is not limited to the above-described examples unless being specified as the NPU.

In addition, the processor 130 may be implemented by a system on chip (SoC). At this time, the SoC may further include the memory 120 and a network interface such as a bus for data communication between the processor 130 and the memory 120 in addition to one or more processors 130.

The processor 130 may receive various processing commands for at least one image stored in the memory 120 from the user. For example, in a case where the display 140 of the electronic device 100 includes a touch screen, the user may touch an application icon on the display 140 to confirm the stored image. The processor 130 executes an application corresponding to the touched icon and displays an execution screen thereof on the display 140.

Alternatively, the user may select at least one image stored in the memory 120 and then select a menu to obtain an AI model computation result for the image. When such a menu is selected, the processor 130 controls the communication unit 110 to transmit the selected images in a homomorphically encrypted form to the server device 200.

In this case, the processor 130 may perform an encoding task for the homomorphic encryption. The types of the encoding may be various as described above.

Figure 3:
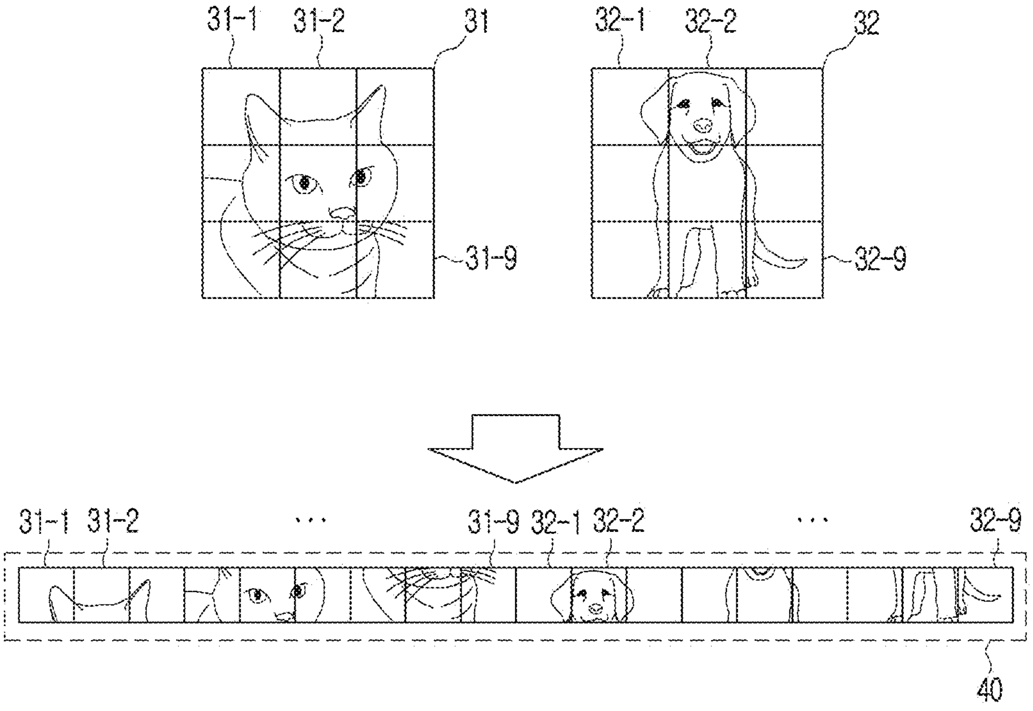
FIGS. 3 to 5 are diagrams for describing various methods of encoding a plurality of images in the electronic device of FIG. 2.
Figure 4:
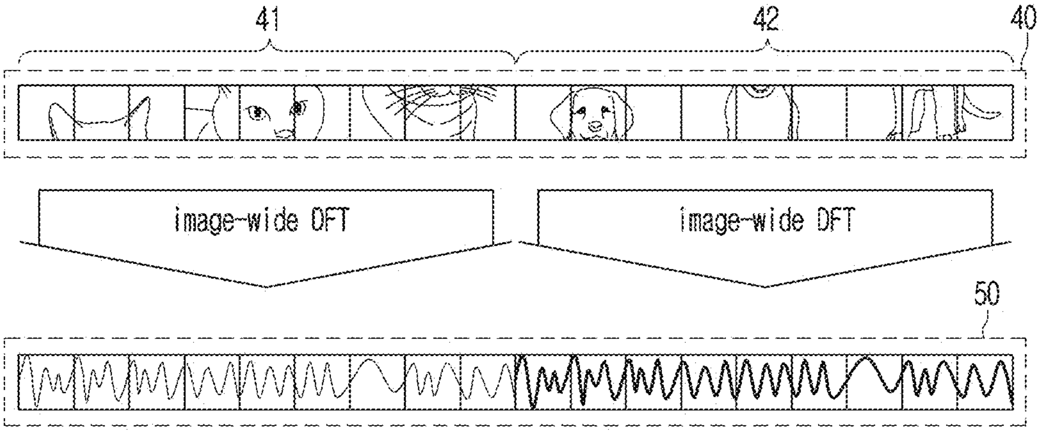
Figure 5:
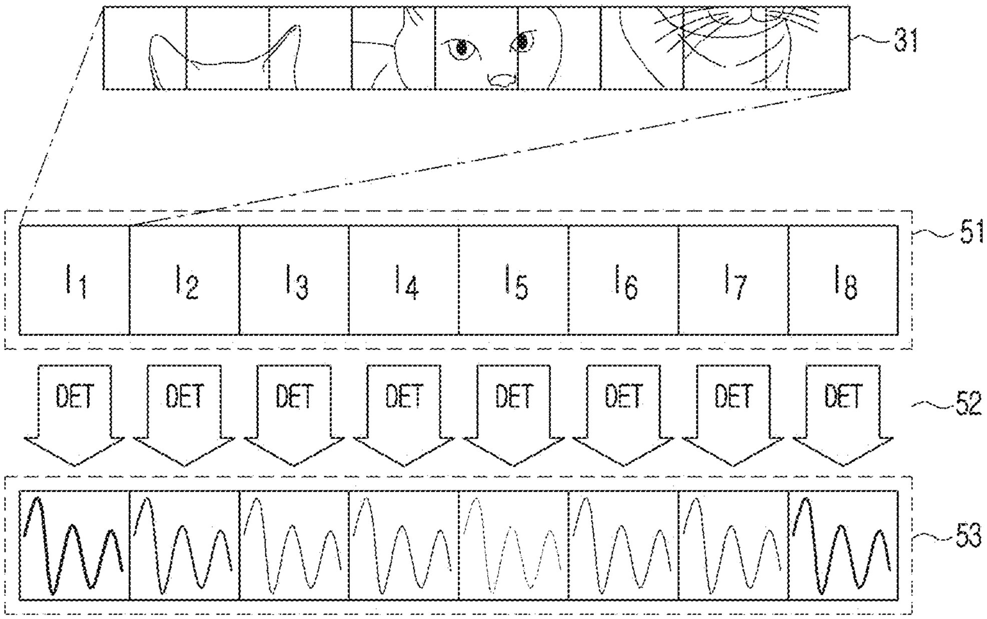

FIGS. 3 to 5 are diagrams for specifically describing a case of performing the CinS encoding among the above-described types of encoding.

FIG. 3 illustrates a method of performing the slot encoding on two images 31 and 32. Referring to FIG. 3, the processor 130 divides the plurality of images 31 and 32 to be transmitted into a plurality of divided images 31-1 to 31-9, and 32-1 to 32-9, respectively. The processor 130 lists all of the divided images 31-1 to 31-9, and 32-1 to 32-9 in the form of a one-dimensional vector and then performs the slot encoding. Specifically, the slot encoding may be performed by performing the FFT in units of entire slots. In a case where the respective images 31 and 32 are m and m', a slot encoding operation of FIG. 3 may be expressed by the following mathematical formula.

$$\langle m\rangle_{slot}\cdot\langle m'\rangle_{slot}=\langle m\odot m'\rangle_{slot}$$ <Mathematical Formula 1>

FIG. 4 is a diagram for describing a method of obtaining the CinS-encoded data using slot-encoded data 40 as in FIG. 3. Referring to FIG. 4, the processor 130 performs the DFT in units of slots 41 and 42 corresponding to the respective images in the slot-encoded data. DFT results of the entire slots may be expressed by the following mathematical formula.

<Mathematical Formula 2>

$$\langle DFT(m_0)|DFT(m_1)\rangle_{slot}\cdot DFT(m_0')|DFT(m_1')\rangle_{slot}=\langle DFT(m_0*_{part}m_0')|DFT(m_1*_{part}m_1')\rangle_{slot}$$

As a result, CinS-encoded data 50 in the form of a frequency signal may be obtained. The CinS-encoded data 50 may be expressed by the following mathematical formula.

<Mathematical Formula 3>

$$<m>_{CinS}\cdot<m'>_{CinS}=\langle m_0*_{part}m_0'|m_1*_{part}m_1'\rangle_{CinS}$$

As described above, when the coefficient encoding is performed in units of images within the entire slots after the slot encoding, image-wise convolutional computation may be made possible in the AI model 221.

In FIGS. 3 and 4, a case where a plurality of images (for example, two images) are included in one ciphertext is illustrated and described, but the above-described CinS encoding may also be applied to a case where a varying number of images are included in one ciphertext.

FIG. 5 is a diagram for describing the CinS encoding method in a case where a plurality of images are included in one ciphertext. Referring to FIG. 5, a DFT 52 is performed on each slot group for slot-encoded data 51 such that one image 31 is included in one slot group I1 including at least one slot, thereby expressing CinS-encoded data 53. The CinS-encoded data 53 in FIG. 5 may be expressed by the following mathematical formula.

The following Mathematical Formula 4 may be applied to the slot-encoded data 51 such that one two-dimensional image or image channel 31 is included in one slot group I1 including at least one slot.

<Mathematical Formula 4>

$$<m>_{CinS}\cdot<m'>_{CinS}=\langle m_0*_{part}m_0'|m_1*_{part}m_1'\rangle\ldots|m_{C-1}*_{part}m_{C-1}'\rangle_{CinS}$$

In Mathematical Formula 4, C may be a slot group corresponding to each image.

The processor 130 may perform the homomorphic encryption on the CinS-encoded data to obtain the homomorphic ciphertext.

The homomorphic ciphertext may be generated by encrypting a plaintext message using a public key. The homomorphic ciphertext may be generated in a form that satisfies the following property when decrypted using a secret key.

$$Dec(ct, sk)=<ct, sk>=M+e(\text{mod } q)$$ <Mathematical Formula 5>

Here, <, > means a usual inner product, ct means the ciphertext, sk means the secret key, M means the plaintext message, e means an encryption error value, and mod q means a modulus of the ciphertext. q needs to be selected such that a scaling factor (Δ) is larger than a result value M multiplied by the message. In a case where an absolute value of the error value e is sufficiently smaller than M, a decrypted value M+e of the ciphertext is a value that may replace an original message with the same precision in significant digit computation. In the decrypted data, the error may be positioned on a least significant bit (LSB) side, and M may be positioned on a next least significant bit side.

The public key, the secret key, and the like are required to perform the homomorphic encryption. The processor 130 may generate and use the public key required for performing the encryption on its own, or may receive and use the public key from an external device. For example, another terminal device performing decryption may generate each of the public key and the secret key, and then distribute the public key to other devices.

A method of generating the public key and the private key may be implemented in various ways. For example, the processor 130 may generate the public key by using a Ring-LWE technique. Specifically, the processor 130 may first set various parameters and rings and store the parameters and rings in the memory 120. Examples of the parameters may include a length of plaintext message bits and sizes of the public key and the secret key.

The ring may be expressed by the following mathematical formula.

$$R=\mathbb{Z}_q[x]/(f(x))$$ <Mathematical Formula 6>

Here, R is the ring, $Z_q$ is a coefficient, and f(x) is an n-th polynomial.

The ring means a set of polynomials having preset coefficients, where addition and multiplication are defined between elements, and the set is closed under the addition and the multiplication.

For example, the ring means a set of n-th polynomials whose coefficient is $Z_q$. Specifically, when n is Φ(N), the ring means an N-th cyclotomic polynomial. (f(x)) represents an ideal of $Z_q[x]$ generated by f(x). An Euler's totient function Φ(N) means the number of natural numbers that are coprime to N and smaller than N. In a case where $\Phi_N(x)$ is defined as the N-th cyclotomic polynomial, the ring may also be expressed as the following Mathematical Formula 7.

$$R=\mathbb{Z}_q[x]/(\Phi_N(x))$$ <Mathematical Formula 7>

The secret key sk may be expressed as follows.

The ring of Mathematical Formula 6 described above may have a complex number in a plaintext space. Meanwhile, among the above-described sets of the ring, only a set whose plaintext space is a real number may be used in order to improve a computation speed for the homomorphic ciphertext.

When the ring is set, the processor 130 may calculate the secret key sk from the ring.

$$sk\leftarrow(1,s(x)),\ s(x)\in R$$ <Mathematical Formula 8>

Here, s(x) means a polynomial randomly generated with a small coefficient.

Further, the processor 130 may calculate a first random polynomial (a(x)) from the ring. The first random polynomial may be expressed as follows.

$$a(x)\leftarrow R$$ <Mathematical Formula 9>

In addition, the processor 130 may calculate the error. Specifically, the processor 130 may extract the error from a discrete Gaussian distribution or a distribution that is statistically close to the discrete Gaussian distribution. Such an error may be expressed as follows.

$$e(x)\leftarrow D_{\alpha q}^{n}$$ <Mathematical Formula 10>

Once the error is calculated, the processor 130 may perform modular computation of the error for the first random polynomial and the secret key to calculate a second random polynomial. The second random polynomial may be expressed as follows.

$$b(x)=-a(x)s(x)+e(x)\ (\mathrm{mod}\ q)$$ <Mathematical Formula 11>

Finally, the public key pk is set as follows in a form including the first random polynomial and the second random polynomial.

$$pk=(b(x),a(x))$$ <Mathematical Formula 12>

The above-described key generation method is only an example, and is not necessarily limited thereto, and it is a matter of course that it is possible to generate the public key and the secret key in other ways.

The processor 130 transmits the homomorphic ciphertext encrypted in the above-described manner to the server device 200 through the communication unit 110.

When the processor 130 receives the encryption computation result of the AI model for the homomorphic ciphertext through the communication unit 110, the processor 130 may decrypt the encryption computation result using the above-described secret key. The processor 130 may display the decrypted computation result on the display 140. In a case where the transmitted image is a test photograph of the body of the user, and the AI model 221 is a model trained for cancer diagnosis, the computation result may include information regarding whether or not the user has a cancer, information regarding a cancerous part of the body in a case where the user has a cancer, information regarding the stage of a cancer, or the like based on comparison between the test photograph of the user and reference data. However, such a computation result does not necessarily have to be used for health checkups, and may be utilized for various purposes depending on a type of the AI model 221.

Meanwhile, in a case where the above-described CinS encoding is performed, the AI model 221 may perform the image-wise convolutional computation, and thus, efficiency of the convolutional computation may be greatly increased. FIG. 6 is a table illustrating an effect when the CinS encoding is performed according to an embodiment of the disclosure.

In FIG. 6, C represents the number of each image or slot group corresponding to the image, and f represents a CNN filter size. Referring to FIG. 6, in a case where the slot encoding is performed, the number of rotations is $2f^2+2C-4$, and one bootstrapping level is consumed, and in a case where the coefficient encoding is performed, the number of rotations is C−1, and one bootstrapping level is consumed. On the other hand, in a case where the CinS encoding is performed, the number of rotations is reduced to: $2\sqrt{C}-2$, and 0 bootstrapping level is consumed.

The bootstrapping level is a level for distinguishing a size of the plaintext space up to a state where bootstrapping needs to be performed. That is, in a case of performing computation using the homomorphic ciphertext, an approximate message weight in the ciphertext obtained as a result of each computation changes.

In a case where the homomorphic ciphertext is generated in the form of Mathematical Formula 5 described above, when q is smaller than M, M+e(mod q) has a different value from M+e, making decryption impossible. Therefore, the value of q needs to always be maintained larger than M. However, as the computation progresses, the value of q gradually decreases. Therefore, an operation for changing the value of q such that the value of q is always larger than M is required. Such an operation is called rebooting or bootstrapping. Alternatively, such an operation may be called a plaintext space expansion operation. In a case where the bootstrapping level is 1, the number of times the bootstrapping needs to be performed is reduced as a result. On the other hand, in a case of performing the CinS encoding, the bootstrapping level is 0, and thus, the number of times the bootstrapping needs to be performed may not be increased. In addition, the number of rotations is also reduced as compared to other encoding methods. As a result, it is possible to perform the image-wise convolutional computation at low cost, and thus, performance of the AI model 221 of the server device 200 may be improved.

Figure 7:
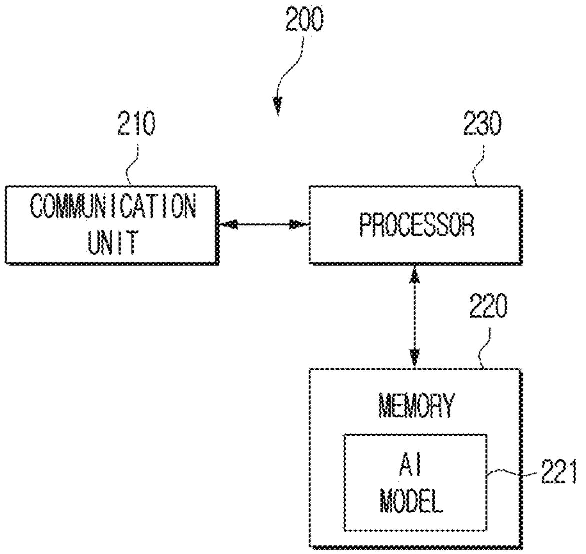
FIG. 7 is a block diagram illustrating a configuration of a server device according to at least one embodiment of the disclosure.

FIG. 7 is a block diagram illustrating a configuration of the server device according to at least one embodiment of the disclosure. Referring to FIG. 7, the server device 200 includes a communication unit 210, a memory 220, and a processor 230. An overlapping description of operations and examples of components of FIG. 7 that are identical or similar to those described in FIG. 2 will be omitted.

The communication unit 210 is a component for receiving various signals or data transmitted from the electronic device 100. The communication unit 210 may receive, from the electronic device 100, the homomorphic ciphertext that is homomorphically encrypted after performing the CinS encoding on at least one image.

The memory 220 may store the AI model for performing computation in an encrypted state, at least one model parameter of the AI model, and the like.

The processor 230 inputs the homomorphic ciphertext received from the electronic device 100 into the AI model 221 to obtain the encryption computation result. The processor 230 transmits the obtained encryption computation result to the electronic device 100 through the communication unit 210.

The AI model 221 may be implemented in various forms. As described above, the AI model 221 may be implemented as the CNN for computation on an image.

The AI model 221 implemented as the CNN includes a convolution layer, a pooling layer, a fully connected layer, and an activation function layer.

The convolution layer performs most computations on the input data. In a case where color image data is input to the AI model 221, the image data may be configured as a three-dimensional pixel matrix structured with a height, a width, and channels (height*width*channel). The channels correspond to R, G, and B, respectively. In the convolution layer, the convolutional computation using an allocated filter may be performed for each channel of the input image data to generate an output image.

The convolutional computation includes not only general convolutional computation but also depth-wise convolutional computation. The depth-wise convolutional computation means convolutional computation performed by applying a filter trained separately for each channel.

Figure 8:
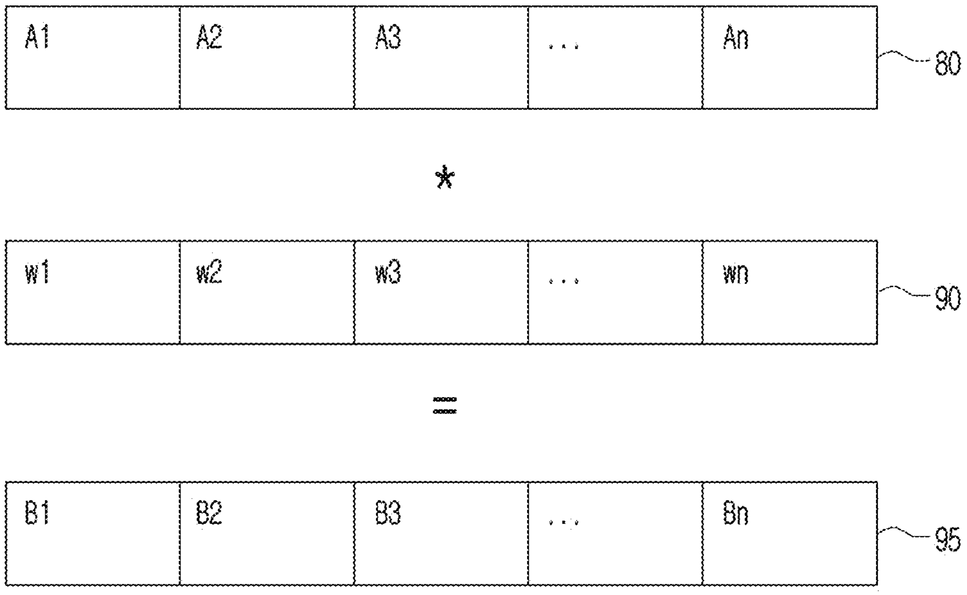
FIGS. 8 and 9 are diagrams for describing various examples of a convolutional computation process of an artificial intelligence (AI) model of the server device of FIG. 7.
Figure 9:
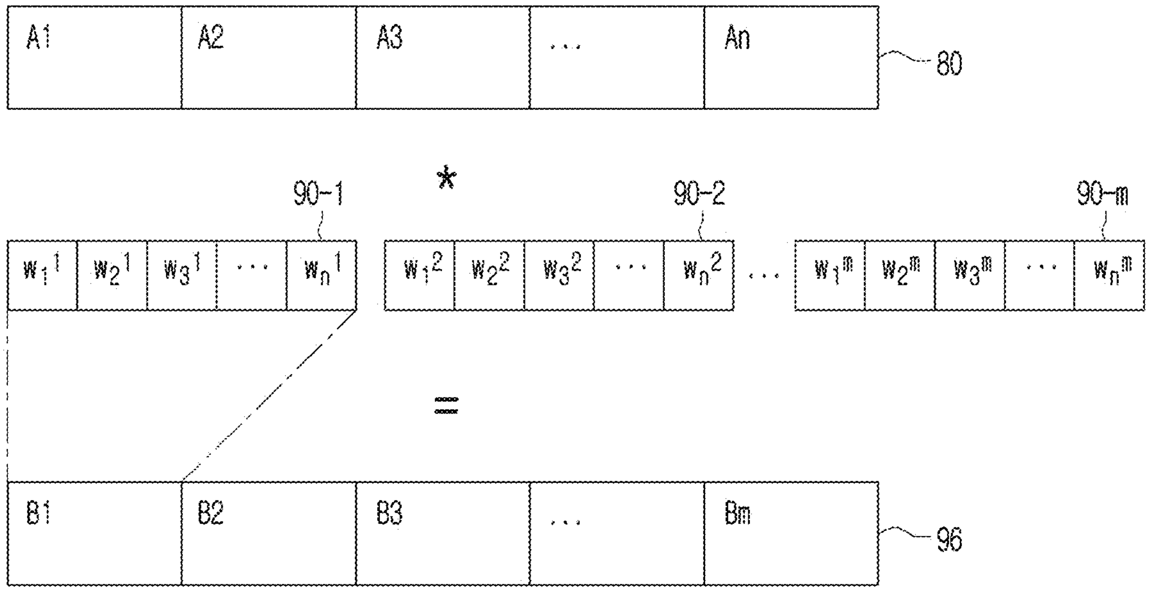

FIGS. 8 and 9 are diagrams for describing various examples of a convolutional computation process of the AI model of the server device of FIG. 7.

Specifically, FIG. 8 is a diagram illustrating a process of performing the depth-wise convolutional computation. A received homomorphic ciphertext 80 in FIG. 8 is a homomorphic ciphertext that is homomorphically encrypted after the CinS encoding for a plurality of images or channels. Therefore, the homomorphic ciphertext 80 may include a total of n slots A1 to An.

The processor 230 may obtain results (B1, B2, . . . , and Bn) 95 of the depth-wise convolutional computation by performing the convolutional computation (A1*w1, A2*w2, . . . , and An*wn) with each slot group of the homomorphic ciphertext by using filters 90 whose number corresponds to the number of entire slot groups among the model parameters stored in the memory 220. As described above, since the CinS encoding is performed, the same result as that of performing the entire depth-wise convolutional computation may be obtained by individual convolutional computation between each slot group and the filter.

FIG. 9 is a diagram illustrating a process of performing normal convolutional computation. The received homomorphic ciphertext 80 in FIG. 9 is a homomorphic ciphertext that is homomorphically encrypted after the CinS encoding for a plurality of images as described in FIG. 8. Therefore, the homomorphic ciphertext 80 may include a total of n slot groups A1 to An.

The processor 230 may obtain data of results (B1 to Bm) 96 of the convolutional computation by performing the convolutional computation using a plurality of model parameters 90-1 to 90-*m* corresponding to a plurality of output channels among the model parameters stored in the memory 220 and the entire slot groups A1 to An of the received homomorphic ciphertext.

The data of the results of the convolutional computation may be expressed as the following mathematical formula.

$$Bi = \sum_{k=1}^{n} Ak * Wk^{i}$$ <Mathematical Formula 13>

In the mathematical formula, B is the convolutional computation result, and for 1≤i≤m, Bi is an image of the i-th output channel.

In the mathematical formula, A is a convolution input, and for 1≤k≤n, Ak is an image of the k-th input channel. W is a model parameter corresponding to a weight of the convolution layer, and $Wk^i$ is the k-th image filter of the i-th output channel. n corresponds to the total number of input channels. A result of the convolutional computation between different image filters with the same output channel and the entire input images becomes an image of one output channel.

Figure 10:
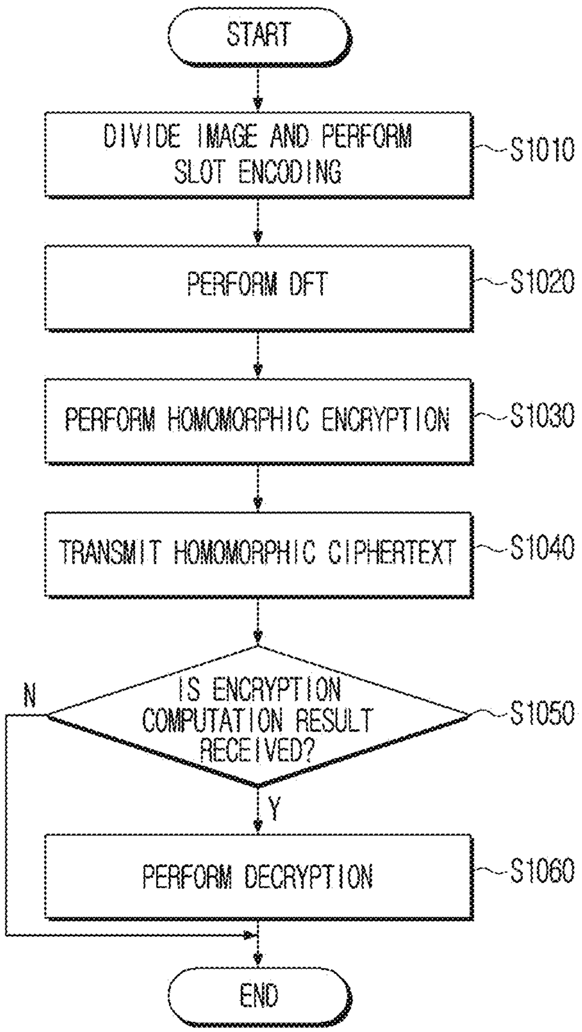
FIG. 10 is a flowchart for describing a data processing method of the electronic device according to at least one embodiment of the disclosure.

FIG. 10 is a flowchart for describing a data processing method of the electronic device according to at least one embodiment of the disclosure.

Referring to FIG. 10, in a case where there is at least one image to be provided to the outside, the electronic device divides the at least one image into a plurality of divided images, lists the entire divided images in the form of a one-dimensional vector, and performs the slot encoding (S1010). Since the image division method and the slot encoding method have been specifically described in the above description, an overlapping description will be omitted.

The electronic device obtains the CinS-encoded data in the form of a frequency signal by performing the DFT on the slot-encoded data in units of slots corresponding to each image (S1020).

The electronic device may obtain the homomorphic ciphertext by homomorphically encrypting the CinS-encoded data (S2030). Since the homomorphic encryption method has been specifically described in the above description, an overlapping description will be omitted.

The electronic device transmits the homomorphic ciphertext to the server device (S1040). Since the AI model that performs computation in an encrypted state is installed in the server device, the server device may input the homomorphic ciphertext into the AI model and perform the encryption computation. The server device may transmit the encryption computation result to the electronic device.

When the encryption computation result is received (S1050), the electronic device may decrypt the encryption computation result by using the previously stored secret key (S1060). In a case where the electronic device does not have the secret key, and another external terminal device has the secret key and has a decryption authority, the electronic device may also transmit the encryption computation result to the terminal device.

When the electronic device performs decryption and obtains the computation result in a plaintext form, the electronic device may provide the computation result to the user in various ways, such as by displaying the computation result or transmitting the computation result to another external terminal device.

The above-described data processing method may be performed by the electronic device illustrated in FIG. 2 described above, but is not necessarily limited thereto and may be performed by devices having various configurations.

Figure 11:
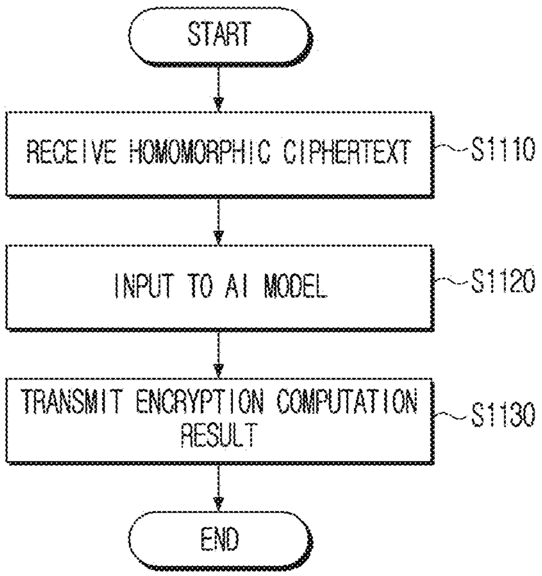
FIG. 11 is a flowchart for describing a data processing method of the service device according to at least one embodiment of the disclosure.

FIG. 11 is a flowchart for describing an encryption processing method of the server device according to at least one embodiment of the disclosure. Referring to FIG. 11, the server device may receive, from the electronic device, the homomorphic ciphertext that is homomorphically encrypted after the CinS encoding for a plurality of images (S1110).

The server device may input the received homomorphic ciphertext into the AI model to obtain the encryption computation result (S1120). The AI model is a model for performing computation in an encrypted state. The AI model may perform convolutional computations and ReLu computations multiple times based on the homomorphic ciphertext and model parameters, extract image features, and output the classified computation result. Since the computation is performed based on the homomorphic ciphertext, such a computation result may also be in the form of the homomorphic ciphertext. The AI model may perform not only the general convolutional computation but also the depth-wise convolutional computation. Since each computation method is described in detail in FIGS. 8 and 9, an overlapping description will be omitted.

The server device transmits the encryption computation result to the electronic device (S1130).

The data processing method of FIG. 11 may be performed by the server device 200 having the configuration illustrated in FIG. 6, but is not necessarily limited thereto, and may be performed by electronic devices having more diverse configurations.

Hereinabove, the CinS encoding, which is one of the encoding technologies that may be used in the homomorphic encryption technology, has been described in detail. When the homomorphic ciphertext is generated after performing the CinS encoding, the server device 200 may perform the encryption computation on the homomorphic ciphertext more efficiently as described above.

Meanwhile, the AI model 221 stored in the server device 200 may perform a plurality of convolutional computations and a plurality of activation function computations in a process of performing the computation on the homomorphic ciphertext. Since the AI model 221 is executed by the processor 230, an operation described below as the operation of the AI model 221 may be understood as being performed by the processor 230.

For example, in a case where the AI model 221 is implemented as a CNN model, the AI model 221 may perform the convolutional computation by using the input homomorphic ciphertext and the filter (that is, the model parameter). The convolutional computation may include repeated addition and multiplication. In the activation function computation, one of various functions such as a sigmoid function and a ReLU function may be used. In addition, the AI model 221 may perform a pooling operation of reducing a size of an image, a batch normalization operation of normalizing distribution of data using an average and a variance in units of batches.

Among such operations, the convolutional computation may be performed based on the CinS-encoded data as described above. However, the activation function computation may be performed based on the slot-encoded data. Therefore, in a case where the electronic device 100 performs the homomorphic encryption on the CinS-encoded data as described above and transmits the homomorphic encryption result, it is necessary to perform conversion between a plurality of different encoding methods (for example, the slot encoding and the CinS encoding).

Figure 12:
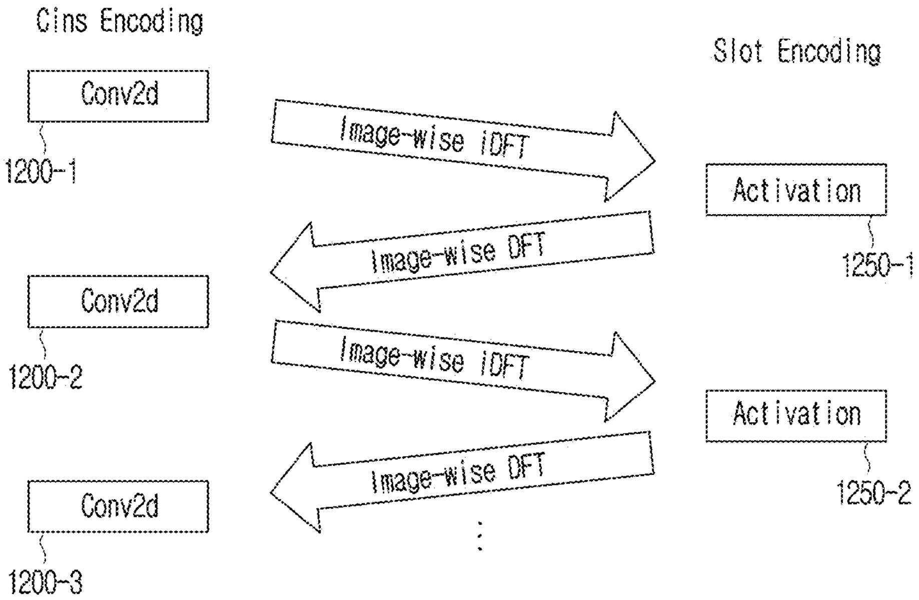
FIG. 12 is a diagram for describing a method of converting an encoding method in the server device according to at least one embodiment of the disclosure.

FIG. 12 is a diagram for describing a method of converting the encoding method in the server device according to at least one embodiment of the disclosure. For distinguishment from the general convolutional computation, the convolutional computation based on the CinS-encoded data is referred to as Conv2d in the disclosure.

Referring to FIG. 12, when the homomorphic ciphertext of the CinS-encoded data obtained by performing the CinS encoding on a plurality of images is received from the electronic device 100 through the communication unit 210, the processor 230 inputs the homomorphic ciphertext into the AI model 221 to obtain the encryption computation result.

The AI model 221 may perform the convolutional computation based on the CinS-encoded data and the model parameter as described in the various embodiments described above. The AI model 221 performs an operation of converting the CinS-encoded data, which is convolutional computation result data, into the slot-encoded data in order to perform the activation function computation after the convolutional computation.

FIG. 12 illustrates a case where image-wise inverse discrete Fourier transform (IDFT) is performed for CinS encoding 1200-1 to obtain slot-encoded data 1250-1. The AI model 221 may perform the activation function computation on the slot-encoded data 1250-1. Thereafter, the AI model 221 may perform image-wise DFT on the slot-encoded data 1250-1 to obtain CinS-encoded data 1200-2 for subsequent convolutional computation.

In this way, the AI model 221 may perform mutual conversion on pieces of CinS-encoded data 1200-1, 1200-2, and 1200-3 and pieces of slot-encoded data 1250-1 and 1250-2.

Meanwhile, in a process of computing the homomorphic ciphertext, the bootstrapping operation is required as described above. In a case where the bootstrapping is frequently performed, a computation time increases accordingly, and a computational burden inevitably increases. In particular, as described above, since the CinS-encoded data obtained by using the new encoding method is used, the conversion between different encoding methods is required, and thus, when the bootstrapping is performed using the AI model 221 of the general CKKS scheme as it is, a computational cost due to the encoding conversion may further increase.

Therefore, according to another embodiment of the disclosure, the bootstrapping, which expands the plaintext space of the homomorphic ciphertext, may be performed together while performing the convolutional computation and the activation function computation using the CinS-encoded data described above.

Figure 13:
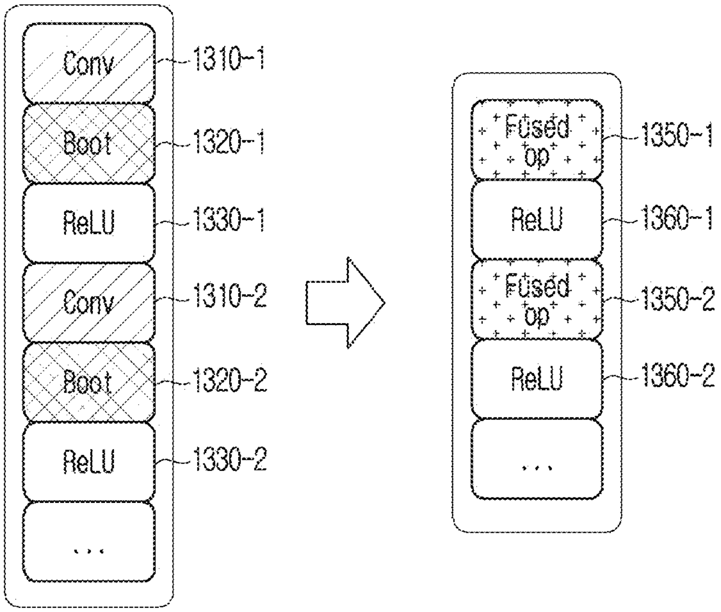
FIG. 13 is a diagram for describing a method of efficiently processing bootstrapping in the server device according to at least one embodiment of the disclosure.

FIG. 13 is a diagram for describing a method of efficiently processing the bootstrapping in the server device according to at least one embodiment of the disclosure. FIG. 13 illustrates comparison between an operation of a general server device and the operation of the server device according to an embodiment of the disclosure.

Referring to FIG. 13, in a case of a server device storing an artificial intelligence model such as the CNN model, when the homomorphic ciphertext is input, convolutional computation 1310-1 and activation function computation 1330-1 for the homomorphic ciphertext are performed a plurality of times. As a result value of the computation gradually increases during the computation process, the plaintext space decreases. Therefore, the server device needs to perform a bootstrapping operation 1320-1 frequently or periodically. FIG. 13 illustrates a case where the convolutional computation 1310-1, the bootstrapping 1320-1, and the activation function computation 1330-1 are sequentially and repeatedly performed.

In the server device according to an embodiment of the disclosure, the homomorphically encrypted homomorphic ciphertext is processed based on the CinS-encoded data described above. The convolutional computation or the depth-wise convolutional computation for the homomorphic ciphertext may be performed based on the CinS-encoded data described above. However, the activation function computation may be performed based on the slot-encoded data. In FIG. 13, the ReLU function is illustrated as an example of the activation function, but it is not limited thereto, and a zigmoid function or other activation functions may be used.

As described above, different types of encoding data may be required for each computation step, and thus, the server device 200 performs an operation of mutually converting a plurality of pieces of encoding data generated by a plurality of different encoding methods.

The server device 200 according to at least one embodiment of the disclosure may perform at least a part of the bootstrapping operation together during a process of changing between the encoding methods. In various embodiments of the disclosure, the computation in which the convolutional computation and the bootstrapping are performed together is illustrated and described as Fused OP operations 1350-1 and 1360-2. FIG. 12 illustrates a case where the server device 200 sequentially and repeatedly performs the Fused OP operations 1350-1 and 1350-2 and activation function computations 1360-1 and 1360-2.

According to such an embodiment, the computational cost for separately performing the bootstrapping may be omitted, the computation on the ciphertext may be efficiently processed. For example, the computational cost when performing the convolutional computation and the bootstrapping together is almost the same as the computational cost required for the bootstrapping. As a result, the computational cost required for the convolutional computation may be omitted.

Figure 14:
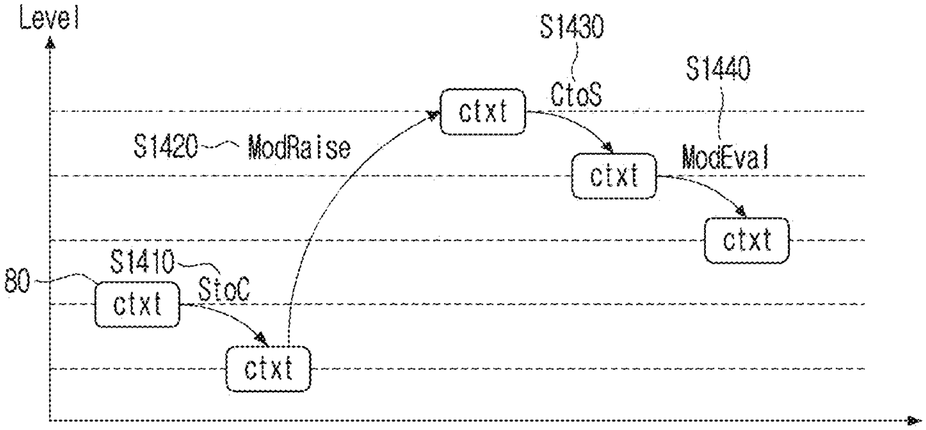
FIGS. 14 and 15 are diagrams for describing a detailed operation of the bootstrapping.
Figure 15:
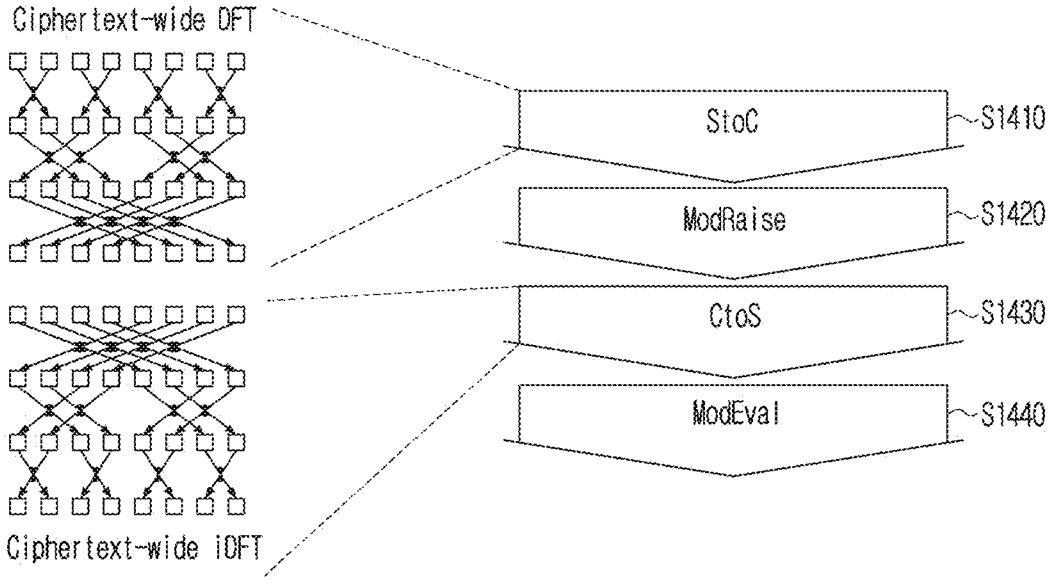

FIGS. 14 and 15 are diagrams for describing a detailed operation of the bootstrapping.

In FIG. 14, a horizontal axis is a time axis, and a vertical axis corresponds to the bootstrapping level described above.

According to at least one embodiment of the disclosure, the bootstrapping operation largely includes an StoC operation (S1410) of converting the slot-encoded data into coefficient-encoded data, a modular raise (ModRaise) operation (S1420) of increasing the modulus of the homomorphic ciphertext, a CtoS operation (S1430) of converting the coefficient-encoded data into the slot-encoded data, and a modular reduction evaluation (ModEval) operation (S1440).

Referring to FIG. 14, after the bootstrapping level is reduced in the StoC operation (S1410) for the homomorphic ciphertext 80, the modulus may be increased by the ModRaise operation (S1420). A data size of the homomorphic ciphertext increases due to the ModRaise operation (S1420).

Thereafter, the processor 230 performs the CtoS operation (S1430) and the ModEval operation (S1440). The processor 230 may perform the CtoS operation (S1430) by performing the IDFT of the entire length unit of the homomorphic ciphertext. The ModEval operation (S1440) is an operation for removing values that are added regardless of the message when increasing the modulus. The processor 230 may calculate a modular function for removing the values that are added regardless of the message by polynomial approximation computation.

FIG. 15 is a diagram for describing a specific method of performing the StoC operation (S1410) and the CtoS operation (S1430) among the bootstrapping operations.

Referring to FIG. 15, the StoC operation (S1410) may be performed by the DFT for the homomorphic ciphertext, and the CtoS operation (S1430) may be performed by the IDFT for the homomorphic ciphertext. The processor 230 may perform the StoC operation (S1410) by performing the DFT of a size of K. Here, K is the number of complex numbers encrypted in a single ciphertext (for example, a ciphertext of size 215). The processor 230 may perform the CtoS operation (S1430) by performing the IDFT of the size of K, similar to the StoC operation (S1410). Specifically, the StoC operation (S1410) and the CtoS operation (S1430) may each be performed using a Fast Fourier Transform (FFT) method.

In a case of using the FFT method, the StoC operation (S1410) may be divided into a step of performing the image-wise DFT and a step of mixing all of the result values. For convenience of explanation, an operation of performing the image-wise DFT is referred to as a first StoC operation, and the remaining operation is referred to as a second StoC operation.

Among the operations, the first StoC operation may correspond to the image-wise DFT performed to convert the slot-encoded data into the CinS-encoded data in the AI model 221. That is, the processor 230 may perform an operation corresponding to the first StoC operation during a process of converting the encoded data without having to separately perform the first StoC operation required for the bootstrapping operation. Therefore, the computational cost is reduced.

Figure 16:
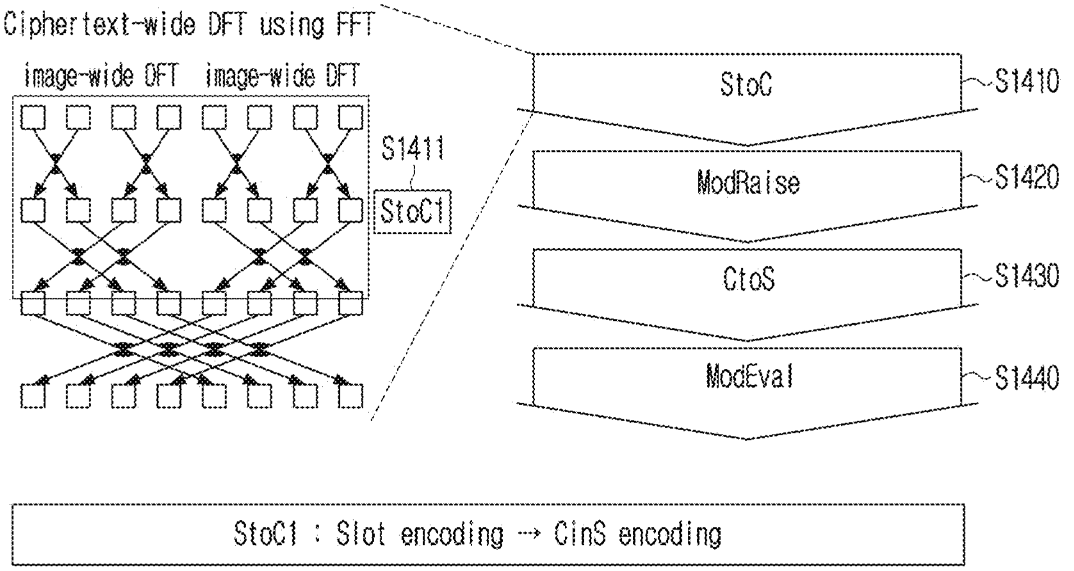
FIGS. 16 and 17 are diagrams for describing a method of efficiently processing the bootstrapping in the server device according to at least one embodiment of the disclosure.
Figure 17:
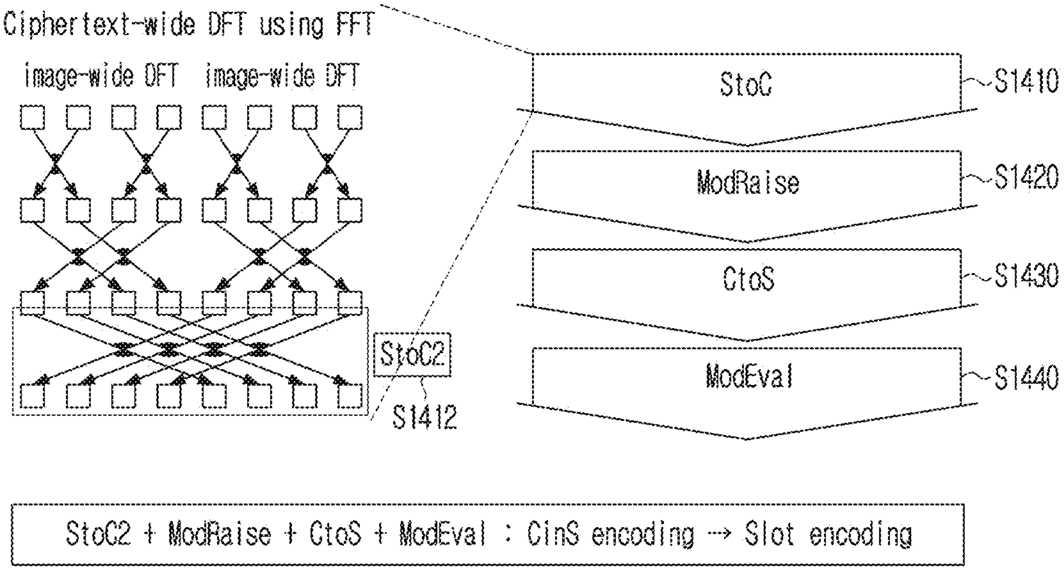

FIGS. 16 and 17 are diagrams for describing a method of efficiently processing the bootstrapping in the server device according to at least one embodiment of the disclosure.

FIG. 16 illustrates the first StoC operation in the StoC operation among the entire steps of the bootstrapping, and FIG. 17 illustrates the remaining operations and steps of the bootstrapping.

Referring to FIG. 16, the processor 130 performs the image-wise DFT on the homomorphic ciphertext (S1411). As described above, the image-wise DFT corresponds to the first StoC operation in the StoC operation (S1410). The slot-encoded data is converted into the CinS-encoded data by the image-wise DFT.

Referring to FIG. 17, the processor 130 performs the image-wise DFT (S1411) and then performs the second StoC operation (S1412) for mixing the DFT results as a whole. As the first StoC operation and the second StoC operation are sequentially performed, the StoC operation (S1410) of the bootstrapping may be completed.

The processor 130 may perform the modular raise (ModRaise) operation (S1420) of increasing the modulus of the homomorphic ciphertext during, before, or after the second StoC operation.

In addition, the processor 130 may perform the CtoS operation of converting the coefficient-encoded data into the slot-encoded data and the modular reduction evaluation (ModEval) operation during a process of converting the CinS-encoded data into the slot-encoded data. Specifically, the second StoC operation (S1412) and the CtoS operation (S1430) correspond to the image-wise IDFT that is performed in the AI model 221 to convert the CinS-encoded data into the slot-encoded data. The AI model 221 may perform the modular raise operation (S1420) between the second StoC operation and the CtoS operation, and perform the modular reduction evaluation operation (S1440) after the image-wise IDFT, thereby completing the entire operation of the bootstrapping. As a result, the bootstrapping may be performed during the process of converting the encoded data into an encoding form required for each computation in the AI model 221.

Figure 18:
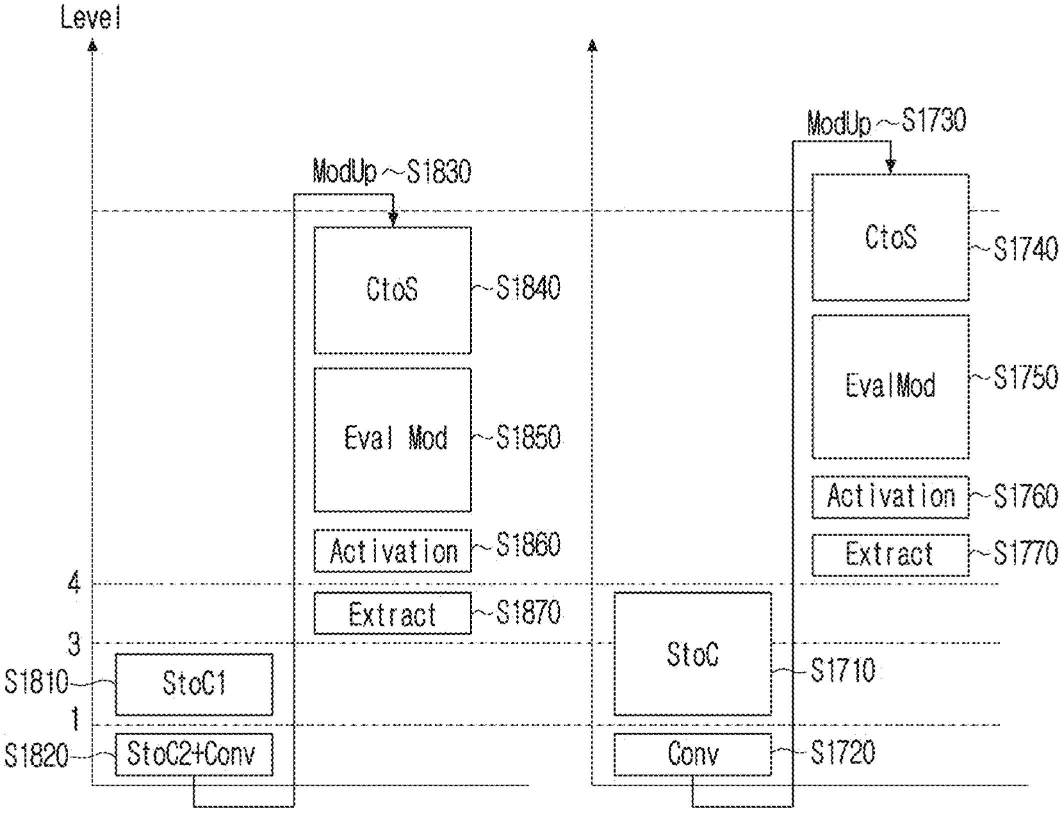
FIG. 18 is a diagram for describing performing Fused OP operations together in the server device according to at least one embodiment of the disclosure.

FIG. 18 is a diagram for describing performing the Fused OP operations in the server device according to at least one embodiment of the disclosure. In FIG. 18, the left side (a) illustrates a case of computing the homomorphic ciphertext for the CinS-encoded data described above, and the right side (b) illustrates a case of computing the homomorphic ciphertext for the coefficient-encoded data encoded in a general coefficient encoding method.

Referring to (a) of FIG. 18, the processor 230 of the server device 200 performs the first StoC operation (S1810) of the bootstrapping by performing the image-wise DFT.

The processor 230 may perform the second StoC operation and the convolutional computation together while performing the DFT (S1820). Thereafter, the processor 230 performs the modular raise operation (S1830) for increasing the modulus, and performs the IDFT for the entire length. The CtoS operation (S1840) of the bootstrapping may be performed by the IDFT for the entire length.

The processor 230 may sequentially perform the modular reduction evaluation operation (S1850) and activation function computation (S1860). After performing the above-described operations at least once, the processor 230 may output a result value (S1870).

In contrast, referring to (b) of FIG. 18, each of steps S1710, S1730, S1740, and S1750 of the bootstrapping, convolutional computation (S1720), and activation function computation (S1760) may be individually performed for the homomorphic ciphertext of the coefficient encoding method, and then a result value may be output (S1770). Accordingly, the computational cost increases as compared to (a) of FIG. 18.

Figure 19:
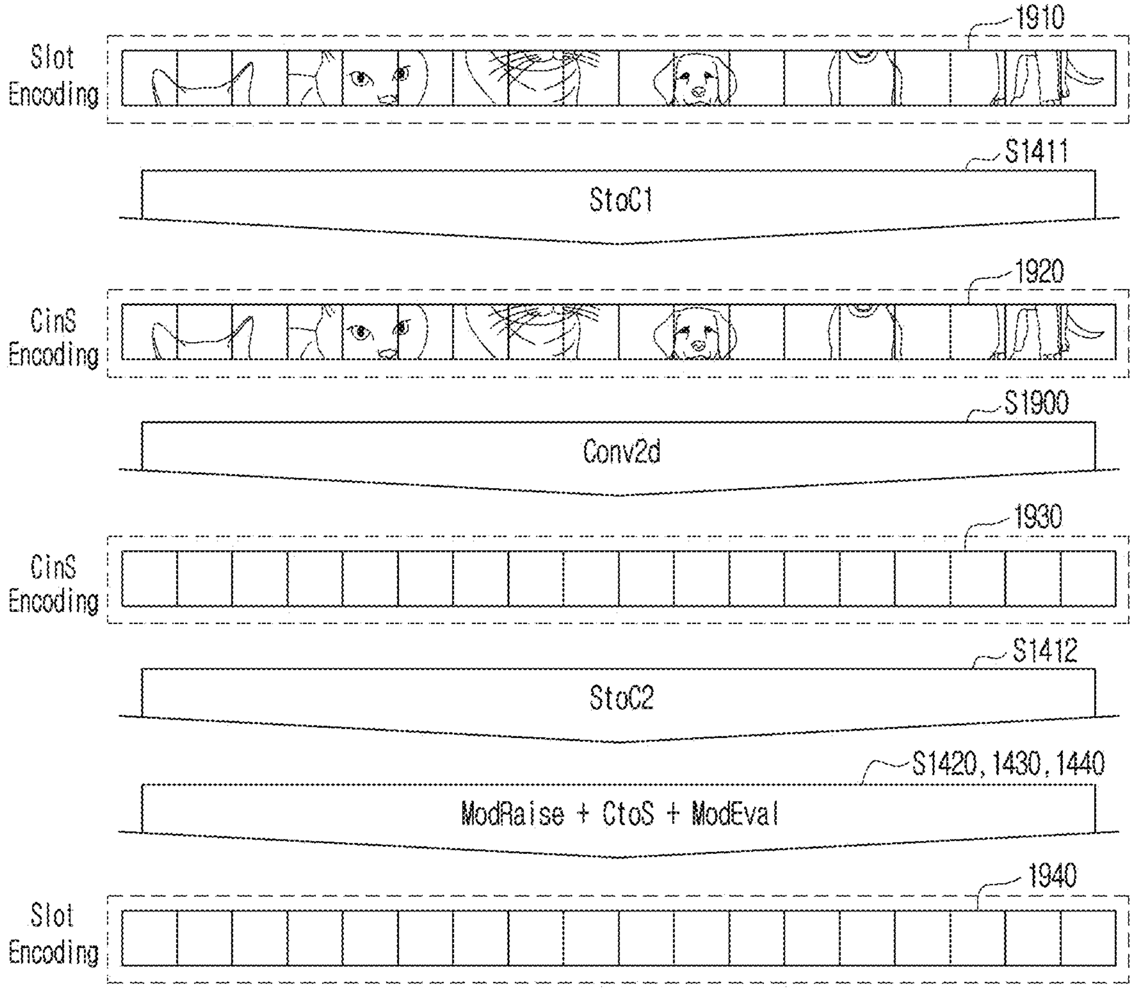
FIGS. 19 and 20 are diagrams for describing a method of performing computation and the bootstrapping together in the server device according to at least one embodiment of the disclosure.

FIG. 19 is a diagram specifically illustrating a process in which the bootstrapping is performed by converting encoded data. Referring to FIG. 19, it may be seen that the first StoC operation (S1411) is performed in a process of converting slot-encoded data 1910 into CinS-encoded data 1920 by performing the image-wise DFT. Thereafter, when the convolutional computation (Conv2d) is performed (S1900), the result data also becomes CinS-encoded data 1930.

The processor 230 may perform the second StoC operation (S1412), the modular raise operation, the CtoS operation, and the modular reduction evaluation operation (S1420, S1430, and S1440) on the CinS-encoded data 1930 to obtain slot-encoded data 1940 while performing the bootstrapping.

Accordingly, the activation function computation for the slot-encoded data becomes possible. The processor 230 may repeatedly perform such computations across a plurality of layers.

Figure 20:
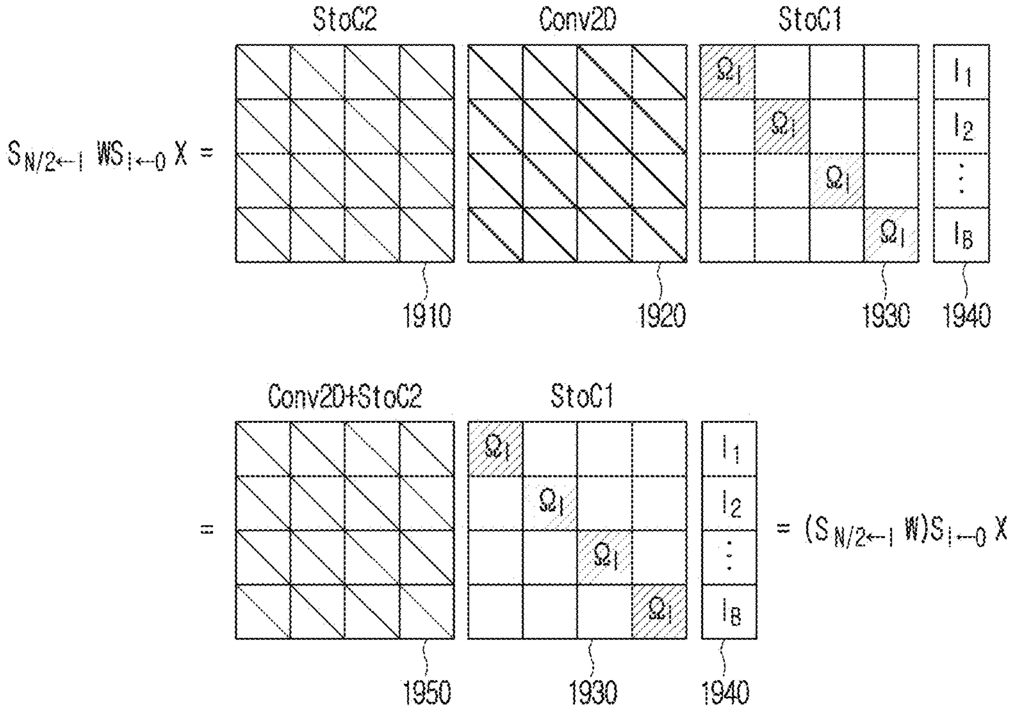

FIG. 20 is a diagram expressing the computation processes of FIG. 19 in matrix form. Referring to FIG. 20, a series of computations processes of FIG. 19 may be expressed as sequential multiplication of a first StoC operation matrix ($S_l \leftarrow 0$) 1930, a kernel matrix (W) 1920 of the convolutional computation, and a second StoC2 operation matrix ($S_{N/2 \leftarrow l}$) 1910 for a ciphertext matrix (X) 1940.

In FIG. 20, 1 represents a slice length of a message vector. As illustrated in FIG. 20, the kernel matrix (W) 1920 of the convolutional computation and the second StoC2 operation matrix ($S_{N/2 \leftarrow 1}$) 1910 are sequentially performed, and calculation patterns thereof are also very similar to each other, and thus, almost the same result as that of performing a composite function in which the two steps are combined may be obtained. By performing the composite function, the computational cost may be greatly reduced as compared to performing the general convolutional computation.

As described above, in the server device according to various embodiments of the disclosure, the bootstrapping may also be performed in a process of converting the encoding method in order to perform the convolutional computation and the activation function computation.

Figure 21:
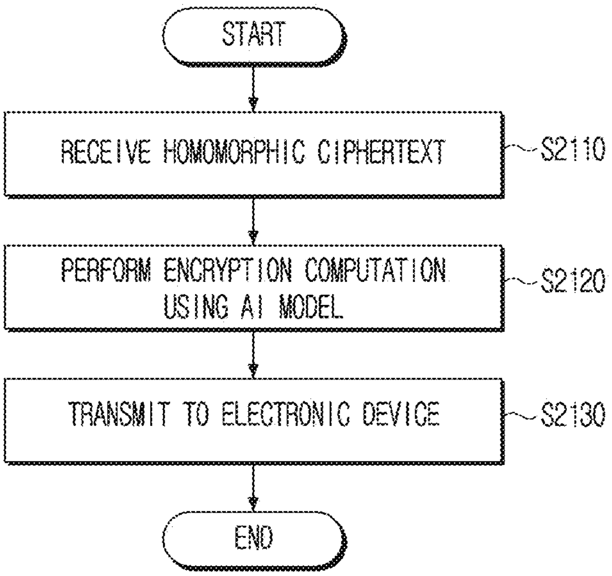
FIG. 21 is a flowchart for describing a data processing method of the server device according to another embodiment of the disclosure.

FIG. 21 is a flowchart for describing a data processing method of the server device according to another embodiment of the disclosure.

Referring to FIG. 21, the server device may receive, from the electronic device, the homomorphic ciphertext of the CinS-encoded data obtained by performing the CinS encoding on a plurality of images (S2110). Since the CinSencoding method and the homomorphic encryption method have been described in the various embodiments described above, an overlapping description will be omitted.

When the homomorphic ciphertext is received, the server device inputs the homomorphic ciphertext into the AI model for performing computation in an encrypted state to obtain the encryption computation result (S2120). Specifically, the AI model stored in the server device may output result values corresponding to the homomorphic ciphertext and the model parameter in an encrypted form while repeatedly performing the convolutional computation, the activation function computation, and other computations a plurality of times.

During an encryption computation process of the AI model, conversion between the CinS-encoded data and the slot-encoded data may be performed multiple times. In addition, an operation of performing the convolutional computation based on the CinS-encoded data and an operation of performing the activation function computation based on the slot-encoded data converted from the CinS-encoded data may also be performed multiple times.

While performing the convolutional computation and the activation function computation in the AI model, the bootstrapping that expands the plaintext space of the homomorphic ciphertext may be performed together. Since the detailed description thereof has been provided above, an overlapping description will be omitted.

When the encryption computation result of the AI model is obtained, the server device transmits the encryption computation result to the electronic device (S2130). The electronic device may decrypt the encryption computation result by using the secret key as described above, thereby securing the computation result.

The data processing method of FIG. 21 may also be performed by the server device having the configuration illustrated in FIG. 7, but is not necessarily limited thereto, and may be performed by devices having various other configurations.

In the above description, various embodiments have been individually described, but each embodiment does not necessarily have to be implemented alone, and may be implemented by being partially or entirely combined with at least one other embodiment.

In addition, a program for performing the various data processing methods described above may be distributed or used while being stored in a non-transitory computer-readable recording medium. The non-transitory computer-readable medium is not a medium that stores data therein for a while, such as a register, a cache, a memory, or the like, but means a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a ROM, or the like.

Although e embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A server device comprising:

a communication unit configured to perform communication with an electronic device;

a memory configured to store an artificial intelligence (AI) model for performing computation in an encrypted state; and a processor, wherein the processor is configured to based on receiving homomorphic ciphertext of CinS-encoded data obtained by performing CinS encoding on a plurality of images from the electronic device through the communication unit, obtain an encryption computation result by inputting the homomorphic ciphertext to the AI model and transmit the encryption computation result to the electronic device through the communication unit, wherein the AI model performs each of convolutional computation based on the CinS-encoded data and activation function computation based on slot-encoded data converted from the CinS-encoded data a plurality of times; and wherein the AI model is configured to repeatedly perform:

convolutional computation based on the CinS-encoded data and a model parameter;

image-wise inverse discrete Fourier transform (IDFT) on result data of the convolutional computation to convert the CinS-encoded data into slot-encoded data;

activation function computation based on the converted slot-encoded data; and image-wise discrete Fourier transform (DFT) on the converted slot-encoded data to convert the slot-encoded data into CinS-encoded data for subsequent convolutional computation.

2. The server device as claimed in claim 1, wherein the AI model performs the convolutional computation based on the CinS-encoded data and model parameter and performs image-wise inverse discrete Fourier transform (IDFT) on result data to convert the CinS-encoded data into the slot-encoded data, and performs image-wise DFT on the converted slot-encoded data to convert the slot-encoded data into CinS-encoded data for subsequent convolutional computation.

3. The server device as claimed in claim 2, wherein the AI model performs bootstrapping that expands a plaintext space of the homomorphic ciphertext together while performing the convolutional computation and the activation function computation.

4. The server device as claimed in claim 3, wherein the bootstrapping includes an StoC operation including a first StoC operation of performing the image-wise DFT on the homomorphic ciphertext and a second StoC operation of mixing all of DFT results, a modular raise (ModRaise) operation of increasing a modulus of the homomorphic ciphertext, a CtoS operation of converting a coefficient-encoded data into the slot-encoded data, and a modular reduction evaluation (ModEval) operation, and wherein the first StoC operation corresponds to the image-wise DFT performed to convert the slot-encoded data into the CinS-encoded data in the AI model.

5. The server device as claimed in claim 4, wherein the second StoC operation and the CtoS operation correspond to the image-wise IDFT performed to convert the CinS-encoded data into the slot-encoded data in the AI model, and the AI model performs the modular raise operation between the second StoC operation and the CtoS operation, and performs the modular reduction evaluation operation after the image-wise IDFT.

6. A data processing method of a server device, the data processing method comprising:

receiving a homomorphic ciphertext of CinS-encoded data obtained by performing CinS encoding on a plurality of images from an electronic device;

obtaining an encryption computation result by inputting the homomorphic ciphertext to an AI model for performing computation in an encrypted state; and transmitting the encryption computation result to the electronic device, wherein in the obtaining of the encryption computation result, each of an operation of performing convolutional computation based on the CinS-encoded data, an operation of converting the CinS-encoded data into slot-encoded data, and an operation of performing activation function computation based on the converted slot-encoded data is performed a plurality of times; and wherein the obtaining of the encryption computation result includes repeatedly performing, by the AI model:

convolutional computation based on the CinS-encoded data and a model parameter;

image-wise inverse discrete Fourier transform (IDFT) on result data of the convolutional computation to convert the CinS-encoded data into slot-encoded data;

activation function computation based on the converted slot-encoded data; and image-wise discrete Fourier transform (DFT) on the converted slot-encoded data to convert the slot-encoded data into CinS-encoded data for subsequent convolutional computation.

7. The data processing method as claimed in claim 6, wherein the obtaining of the encryption computation result includes:

performing the convolutional computation based on the CinS-encoded data and model parameter and performing image-wise IDFT on result data to convert the CinS-encoded data into the slot-encoded data; and performing image-wise DFT on the converted slot-encoded data to convert the slot-encoded data into CinS-encoded data for subsequent convolutional computation.

8. The data processing method as claimed in claim 7, wherein the AI model performs bootstrapping that expands a plaintext space of the homomorphic ciphertext together while performing the convolutional computation and the activation function computation.

9. The data processing method as claimed in claim 8, wherein the bootstrapping includes an StoC operation including a first StoC operation of performing the image-wise DFT on the homomorphic ciphertext and a second StoC operation of mixing all of DFT results, a modular raise (ModRaise) operation of increasing a modulus of the homomorphic ciphertext, a CtoS operation of converting a coefficient-encoded data into the slot-encoded data, and a modular reduction evaluation (ModEval) operation of reducing the modulus of the homomorphic ciphertext, and wherein the first StoC operation corresponds to the image-wise DFT performed to convert the slot-encoded data into the CinS-encoded data in the AI model.

10. The data processing method as claimed in claim 9, wherein the second StoC operation and the CtoS operation correspond to the image-wise IDFT performed to convert the CinS-encoded data into the slot-encoded data in the AI model, and wherein in the obtaining of the encryption computation result, the AI model performs the modular raise operation between the second StoC operation and the CtoS operation, and performs the modular reduction evaluation operation after the image-wise IDFT.

* * * * *